United States Patent
Eber et al.

(10) Patent No.: US 11,740,342 B2
(45) Date of Patent: Aug. 29, 2023

(54) METHOD AND APPARATUS FOR SELECTING A RANGING ANCHOR BASED ON CHARACTERISTICS OF COMMUNICATION BETWEEN A CONNECTION ANCHOR AND A MOBILE ELECTRONIC DEVICE

(71) Applicant: NXP B.V., Eindhoven (NL)

(72) Inventors: Wolfgang Eber, Graz (AT); Dorian Haslinger, Graz (AT); Mehmet Ufuk Buyuksahin, Graz (AT)

(73) Assignee: NXP B.V., Eindhoven (NL)

( * ) Notice: Subject to any disclaimer, the term of this patent is extended or adjusted under 35 U.S.C. 154(b) by 260 days.

(21) Appl. No.: 17/036,891

(22) Filed: Sep. 29, 2020

(65) Prior Publication Data

US 2022/0099816 A1   Mar. 31, 2022

(51) Int. Cl.
  *G01S 11/02*   (2010.01)
  *B60R 25/24*   (2013.01)
  *B60R 25/04*   (2013.01)

(52) U.S. Cl.
  CPC .............. *G01S 11/02* (2013.01); *B60R 25/24* (2013.01); *B60R 25/04* (2013.01); *B60R 2325/101* (2013.01); *B60R 2325/205* (2013.01)

(58) Field of Classification Search
  CPC ......... G01S 11/02; B60R 25/24; B60R 25/04; B60R 2325/101; B60R 2325/205
  See application file for complete search history.

(56) References Cited

U.S. PATENT DOCUMENTS

| | | | |
|---|---|---|---|
| 6,414,628 B1* | 7/2002 | Ashihara | G01S 7/4056 342/115 |
| 10,559,149 B1* | 2/2020 | Kuechler | G07C 9/00309 |
| 11,137,491 B2* | 10/2021 | Kim | G01S 13/765 |
| 2016/0234684 A1* | 8/2016 | Hekstra | G06F 21/30 |
| 2018/0099643 A1* | 4/2018 | Golsch | G01S 13/765 |
| 2018/0275268 A1* | 9/2018 | Reisinger | H04L 7/0008 |
| 2020/0132807 A1* | 4/2020 | Kong | B60R 25/209 |
| 2021/0072345 A1* | 3/2021 | Menaker | G01S 7/288 |

FOREIGN PATENT DOCUMENTS

WO   2020/162033 A1   8/2020

* cited by examiner

*Primary Examiner* — Thomas D Alunkal

(57) ABSTRACT

A first anchor of a first type communicates with a mobile electronic device. A characteristic of the communications between the first anchor of the first type and the mobile electronic device is determined. One or more second anchors each of a second type is selected based on the characteristic of the communications. A respective distance to the mobile electronic is determined based on each of the selected one or more second anchors each of the second type.

23 Claims, 4 Drawing Sheets

210

| Index 302 | Connection Anchor 304 | Selected Ranging Anchor 306 |
|---|---|---|
| 1 | 104-3 (SQM) | 106-1<br>106-3 |
| 2 | 104-1 (SQM,D)<br>104-2 (SQM,D) | 106-1, 106-3 |
| ... | ... | ... |
| Z | ... | ... |

FIG. 3

METHOD AND APPARATUS FOR SELECTING A RANGING ANCHOR BASED ON CHARACTERISTICS OF COMMUNICATION BETWEEN A CONNECTION ANCHOR AND A MOBILE ELECTRONIC DEVICE

FIELD OF USE

This disclosure generally relates to communication systems, and more particularly to a method and apparatus for selecting a ranging anchor based on characteristics of communication between a connection anchor and a mobile electronic device.

BACKGROUND

Wireless electronic access to vehicles, homes, and office buildings is becoming prevalent in our connected society. For example, a driver carrying a passive keyless entry ("PKE") device such as a key fob is provided access to a vehicle when the PKE device is in proximity to the vehicle. The access includes unlocking a door of the vehicle on approach to the vehicle, and locking the door when the driver walks away from the vehicle, among other functions. To provide this access, one or more ranging anchors located inside the vehicle or on an outside of the vehicle are used to determine a distance to the PKE device by exchange of packets between the ranging anchor and the PKE device. If the driver carrying the PKE device is approaching the vehicle, the determined distance decreases over time while if the driver carrying the PKE device is walking away from the vehicle, the determined distance increases over time. In some environments such as in a parking garage or parking lot, many vehicles in close proximity to each other perform the distance determination simultaneously resulting in many packets being exchanged over the air between the PKE device and the one or more ranging anchors of the vehicle. The exchange of many packets over the air increases chances of the packets colliding and having to be retransmitted in order to complete the distance determination.

BRIEF DESCRIPTION OF THE DRAWINGS

FIG. 3 illustrates an example selection table for selecting the ranging anchor in accordance with embodiments of the invention.

Figure 1:
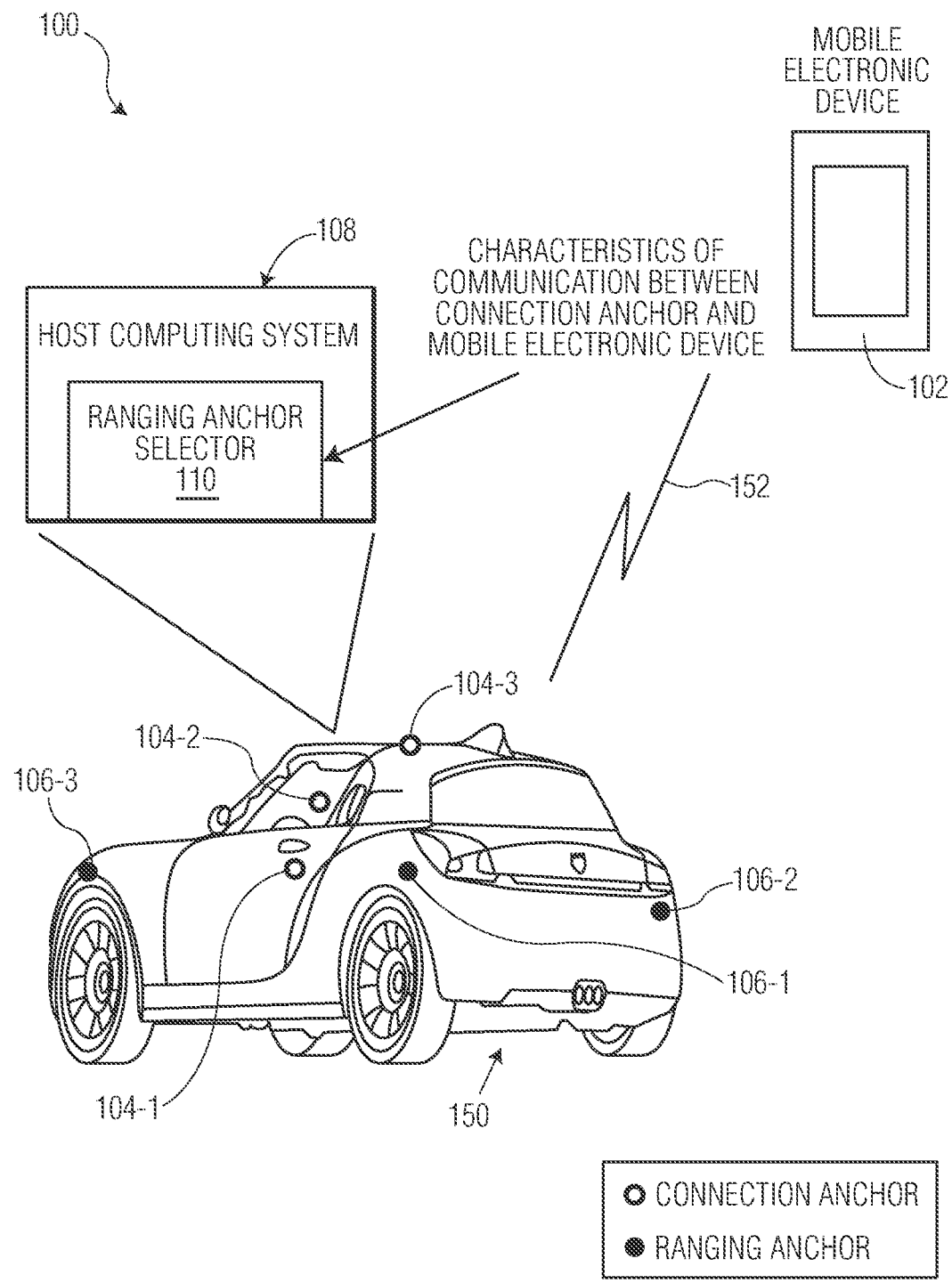
FIG. 1 illustrates an example ranging system for selecting a ranging anchor based on characteristics of communications between a connection anchor and a mobile electronic device in accordance with embodiments of the invention.

The drawings are for the purpose of illustrating example embodiments, but it is understood that the embodiments are not limited to the arrangements and instrumentality shown in the drawings.

DETAILED DESCRIPTION

The description that follows includes example systems, methods, techniques, and program flows for selecting a ranging anchor of a vehicle based on characteristics of communication between a connection anchor of the vehicle and a mobile electronic device. One or more connection anchors communicate with a passive keyless entry ("PKE") device such as the mobile electronic device to perform various functions associated with an automobile application such as door unlock, enabling engine start, activating external/internal lighting, or other driver preferences. In examples, the connection anchor may operate in accordance with a wireless technology such as Bluetooth Low Energy (BLE) and take the form of a BLE anchor. One or more ranging anchors are used to determine a distance to the mobile electronic device and to determine a type of access to be provided to the vehicle. The access includes unlocking a door of the vehicle on approach to the vehicle, and locking the door when the driver walks away from the vehicle, among other functions. The ranging anchor may operate in accordance with a wireless technology such as an ultra-wide band (UWB) technology, and typically consumes more power than the connection anchors. The host computing system selects the ranging anchors used to determine the distance to the mobile electronic device after the mobile electronic device is authenticated and based on characteristics of communication between a connection anchor and the mobile electronic device. In one example, the characteristic is a signal quality metric between a connection anchor and the mobile electronic device. In another example, the characteristic is a distance between the connection anchor and the mobile electronic device determined based on a time of flight of wireless signals communicated between the connection anchor and the mobile electronic device. The ranging anchor(s) that are selected are those in proximity to a connection anchor with the signal quality metric that meets a threshold or a connection anchor whose distance to the mobile electronic device meets a threshold. Additionally, or alternatively, in the case of a vehicle application, the selected ranging anchor(s) are on a same side of the vehicle as a connection anchor associated with the signal quality metric that meets the threshold or a connection anchor whose distance to the mobile electronic device meets a threshold.

By selecting the ranging anchor(s) based on characteristics of communication between a connection anchor and the mobile electronic device, those ranging anchors which likely produce a reliable distance determination to the mobile electronic device are used. Those ranging anchors which do not likely provide a reliable distance determination might not be used, resulting in reduced power consumption with a same level of distance accuracy. Well known instructions, protocols, structures, and techniques have not been shown in detail in order not to obfuscate the description.

Example System

FIG. 1. illustrates an example ranging system 100 for selecting a ranging anchor based on characteristics of communications between a connection anchor and a mobile electronic device in accordance with embodiments of the invention. The system includes a passive keyless entry ("PKE") device shown as a mobile electronic device 102, one or more connection anchors 104-1 to 104-M (collectively connection anchors 104) associated with a vehicle 150, and one or more ranging anchors 106-1 to 106-N (collectively ranging anchors 106) associated with the vehicle 150 to perform the ranging operation, where M=3 and N=3 in this example. In other examples, the ranging operations may be performed in a home or building instead of the vehicle 150 or with respect to an internet of things (IoT) device such a wireless inventory tracking device or connected appliance, as examples. Further, the number, M, of connection anchors 104, and the number, N, of ranging anchors may be greater or less than 3.

The mobile electronic device 102 may take many forms, including application-specific or personal computerized devices such as, for example, transponder cards, personal digital assistants, tablets, cellular phones, smart phones, or key fobs. In examples, the mobile electronic device 102 may have a wireless radio and be implemented in software, circuitry such as analog circuitry, mix signal circuitry, memory circuitry, logic circuitry, processing circuitry, or combinations thereof.

The connection anchors 104 communicate with the mobile electronic device 102 to perform various functions associated with an automobile application such as door unlock, enabling engine start, activating external/internal lighting, or other driver preferences. The communications may be shown as a wireless signals 152 and in some examples include a connection anchor transmitting a wireless signal in the form of a beacon. In the event that the mobile electronic device 102 is within range of the beacon, the mobile electronic device 102 provides a wireless signal in the form of a response to the beacon transmitted by the connection anchor. In some examples, the communication may further include authenticating the mobile electronic device 102. The authentication may comprise the connection anchor sending a challenge ("question") to the mobile electronic device 102 and the mobile electronic device 102 sending a response in the form of an answer to the challenge such as a shared secret to the connection anchor. In the event that the response is what the connection anchor expected, the mobile electronic device 102 is authenticated and allowed to perform various vehicle access functions such as door unlock, enabling engine start, activating external/internal lighting, or other driver preferences in an automobile application using the connection anchor. In examples, the connection anchors 104 may operate in accordance with a wireless technology such as Bluetooth Low Energy (BLE) and take the form of a BLE anchor. BLE is a wireless personal area network technology designed and marketed by the Bluetooth Special Interest Group. The BLE anchor may send the wireless signals in the form of broadcast packets such as advertisements to which the mobile electronic device 102 responds. In examples, each of the connection anchors 104 may have a wireless radio and be implemented in software, circuitry such as analog circuitry, mix signal circuitry, memory circuitry, logic circuitry, processing circuitry, or combinations thereof.

After performing the authentication and as part of providing the vehicle access, a ranging anchor may be used to determine a distance to the mobile electronic device 102. The ranging anchors 106 may operate in accordance with a wireless technology such as an ultra-wide band (UWB) technology to communicate information between the mobile electronic device 102 and the ranging anchors 106. Specifications for such UWB technology are set forth in the Institute of Electrical and Electronics Engineers (IEEE) 802.15.4a which is a standard that specifies a wireless physical layer (PHY) to enable precision distance determinations. The ranging anchors 106 may be referred to as a UWB anchor in some examples. The ranging anchors 106 may use other wireless technologies such as BLE with high accuracy distance measurement (HADM). In examples, the wireless technology associated with the ranging anchors 106 may operate at a higher bandwidth than the wireless technology associated with the connection anchor 104 and consume more power compared to the wireless technology associated with the connection anchor 104. In examples, each of the ranging anchors 106 may have a wireless radio and be implemented in software, circuitry such as analog circuitry, mix signal circuitry, memory circuitry, logic circuitry, processing circuitry, or combinations thereof.

A characteristic of communications between a connection anchor and the mobile electronic device 102 may be used to select a ranging anchor to determine a distance to the mobile electronic device 102. The characteristic may take many forms. In one example, the characteristic may be a signal quality metric. In a typical environment, wireless signals communicated between the connection anchor and the mobile electronic device 102 may be reflected by other vehicles in the environment or pass through objects such as the driver which carries the mobile electronic device 102. A strongest received wireless signal may be measured and referred to as a main path power signal quality metric while an overall power of received wireless signals may be measured and referred to as an received signal strength indicator (RSSI) signal quality metric. The signal quality metric may be also characterized by an error rate associated with communications between a connection anchor and the mobile electronic device 102.

In another example, the characteristic may be a distance between a connection anchor and the mobile electronic device 102 determined based on a time of flight of wireless signals communicated between the connection anchor and the mobile electronic device 102. The distance may be determined by transmitting and receiving wireless signals in the form of the packets between the mobile electronic device 102 and the connection anchor. In an example, the connection anchor and the mobile electronic device 102 may have synchronized clocks and the connection anchor determines a timestamp when a packet is transmitted from a connection anchor to a mobile electronic device 102 (i.e., time of departure (ToD)) and the mobile electronic device 102 determines a timestamp when the packet transmitted by the connection anchor is received by the mobile electronic device 102 (i.e., time of arrival (ToA)). The ToD and ToA may be used to calculate a time of flight (ToF) of the packet. If the host computing system 108 calculates the ToF, then the mobile electronic device 102 may provide the ToA to the host computing system 108. If the mobile electronic device 102 calculates the ToF, then the host computing system 108 may provide the ToD to the host computing system 108. Based on a speed of light c which is known, the ToF may then be used to calculate a distance between the mobile electronic device 102 and the connection anchor.

In other examples, the mobile electronic device 102 determines a timestamp when a packet is transmitted from the mobile electronic device 102 to a connection anchor (i.e., ToD) and the connection anchor determines a timestamp when the packet transmitted by the mobile electronic device 102 is received by the connection anchor (i.e., ToA). If the host computing system 108 calculates the ToF, then the mobile electronic device 102 may provide the ToD to the host computing system 108. If the mobile electronic device 102 calculates the ToF, then the host computing system 108 may provide the ToA to the host computing system 108. The ToD and ToA may be used to calculate a distance between the mobile electronic device 102 and the connection anchor as described above.

The distance determined using the connection anchor in accordance with various embodiments may be a coarse distance measurement compared to a finer distance measurement using a ranging anchor. In some embodiments, one reason for the difference in distance determination accuracy is because a bandwidth of the wireless signals transmitted by the connection anchor may be smaller than a bandwidth of wireless signals associated with the ranging anchor 106. For example, BLE of the connection anchor has a center frequency of 2.4 gigahertz (GHz) with a bandwidth of 80 megahertz (MHz) compared to UWB technology of the ranging anchor which has a center frequency ranging from 5 to 10 GHz with a bandwidth of 500 MHz or higher. A smaller bandwidth of the wireless signals may result in a less accurate determination of when a packet departs from the connection anchor (e.g., ToD) or when the packet arrives at the mobile electronic device 102 (e.g., ToA) compared to when the wireless signal has a higher bandwidth. The less accurate determination of ToA and ToD results in a coarser distance determination with a benefit of less power consumption compared to using a ranging anchor which transmits wireless signals with a higher bandwidth resulting in a higher power consumption with more accurate distance determination.

The connection anchors 104 and ranging anchors 106 of the host computing system 108 may be located inside the vehicle 150, on an exterior of the vehicle 150, or both inside and on the exterior of the vehicle 150. In examples, the connection anchors 104 may be positioned so that a connection with the mobile electronic device 102 is stable and the ranging anchors 106 may be positioned to maximize an area around the vehicle 150 within which ranging may be accurately performed. In an example, the vehicle 150 may have the connection anchor 104-1 located below a handle at a left door of the vehicle 150, the connection anchor 104-2 located at a center front console in the vehicle 150, and the connection anchor 104-3 located on a roof the vehicle 150. Further, the vehicle 150 may have the ranging anchor 106-1 located on a left rear bumper of the vehicle 150, the ranging anchor 106-2 located on at a right rear bumper of the vehicle 150, and the ranging anchor 106-3 located at a front left bumper of the vehicle 150. The vehicle 150 may have additional or different connection anchors 104 and ranging anchors 106 located at different positions of the vehicle 150 compared to what is shown.

Various embodiments are directed to selecting one or more ranging anchors 106 to determine the distance to the mobile electronic device 102 based on the characteristic of communications between a connection anchor and the mobile electronic device 102. The characteristic may be the signal quality metric between a connection anchor and the mobile electronic device 102 or the distance between a connection anchor and the mobile electronic device 102 determined based on a time of flight of wireless signals communicated between the connection anchor and the mobile electronic device. The characteristic may be compared to a threshold. In the event that a connection anchor with the characteristic of communications meets a threshold (e.g., the characteristic of communications is equal to, greater than, or less than the threshold), the connection anchor may be used to select the ranging anchors 106 to determine a distance to the mobile electronic device 102. In one example, a connection anchor with a characteristic of the signal quality which is greater or equal to than a threshold may be used to select a ranging anchor. In another example, a connection anchor with a characteristic of communication of distance between the connection anchor and a mobile electronic device less than or equal to a threshold may be used to select a ranging anchor. The ranging anchor(s) 106 which are selected may be in proximity to a connection anchor with the characteristic of communications which meets a threshold (where proximity is defined as a threshold distance from the connection anchor 104, and in some examples the threshold distance is smaller than a distance from the connection anchor 104 to a farthest ranging anchor). Said another way, the selected ranging anchor(s) 106 may be one or more ranging anchors 106 that are physically close to the connection anchor with the characteristic of communications which meets a threshold, in comparison with other ranging anchor(s) 106 that are farther away from the connection anchor 104 with the characteristic of communications which meets a threshold. A ranging anchor proximate to a connection anchor with the characteristic of communications which meets a threshold may likely provide a reliable distance determination to the mobile electronic device 102. For instance, connection anchor 104-1 may be in proximity to ranging anchor 106-1, 106-3, but may be considered not to be in proximity to ranging anchor 106-2. Additionally, connection anchor 104-2 may be in proximity to ranging anchor 106-1, 106-3, but may be considered not to be in proximity to ranging anchor 106-2. Still additionally, connection anchor 104-3 may be in proximity to ranging anchors 106-1 and 106-2, but may be considered not to be in proximity to ranging anchor 106-3. Other variations are also possible.

Although FIG. 1 shows only connection anchors 104 and ranging anchors 106 on the driver/left side and back side of the vehicle 150, additional connection anchors and ranging anchors may be located on the passenger/right side and front side of the vehicle 150. In another example, the ranging anchor(s) which are selected may be on the same side or portion of the vehicle 150 (e.g., driver/left side, passenger/right side, front side or portion, or back side or portion) as the connection anchor(s) with the characteristic of communications which meets a threshold. The ranging anchor(s) on the same side of the vehicle 150 as the connection anchor(s) 104 with the characteristic of communications which meets a threshold may likely provide a reliable distance determination to the mobile electronic device 102. Further, the ranging anchor(s) on the same side as the connection anchor(s) may be selected because the characteristic of communications associated with the connection anchor 104 with the characteristic of communications may indicate that a driver carrying the mobile electronic device 102 is approaching the vehicle 150 or departing from the vehicle from that side. For instance, in the event that the signal quality metric or distance associated with the connection anchor 104-1 at the left side of the vehicle 150 meet a respective threshold, the mobile electronic device 102 may be approaching or departing from the vehicle from the left side and ranging anchors 106-1 and 106-3 may be selected. As another example, in the event that the signal quality metric or distance associated with the connection anchors 104-2 at a center front console of the vehicle 150 meet a respective threshold, the mobile electronic device 102 may be approaching or departing from the vehicle from the front and ranging anchor 106-3 may be selected.

In examples, the ranging anchor(s) are selected after the mobile electronic device 102 is authenticated but before any of the ranging anchor(s) are activated. UWB ranging as well as other types of ranging associated with the ranging anchors 106 are power hungry operations. By selecting the ranging anchor(s) based on characteristics of communication between a connection anchor and the mobile electronic device, those ranging anchor(s) which likely produce a reliable distance determination to the mobile electronic device (e.g., in a line of sight or within an operating distance) are used in a distance determination. Those ranging anchor(s) which do not provide a reliable distance determination might not be used, resulting in reduced power consumption with a same level of distance accuracy since those ranging anchor(s) are not activated or used.

In examples, the vehicle 150 may have a host computing system 108. The host computing system 108 may be communicatively coupled to the connection anchors 104 and ranging anchors 106 and may be arranged with a ranging anchor selector 110 to select the ranging anchors 106 as described above based on the characteristic of communications between a connection anchor 104 and the mobile electronic device 102. The host computing system 108 may perform additional functions. For example, the host computing system 108 may provide an indication of the selected ranging anchor(s) to the mobile electronic device 102 via a connection anchor so that the mobile electronic device 102 is able to communicate with the selected ranging anchor(s) and determine a distance between the mobile electronic device 102 and the selected ranging anchor(s). Based on the distance determination, the host computing system 108 may also provide access to the vehicle 150 such as unlocking a door of the vehicle on approach to the vehicle 150 or when a door handle is pulled, and locking the door when the driver walks away from the vehicle 150 on exit.

Figure 2:
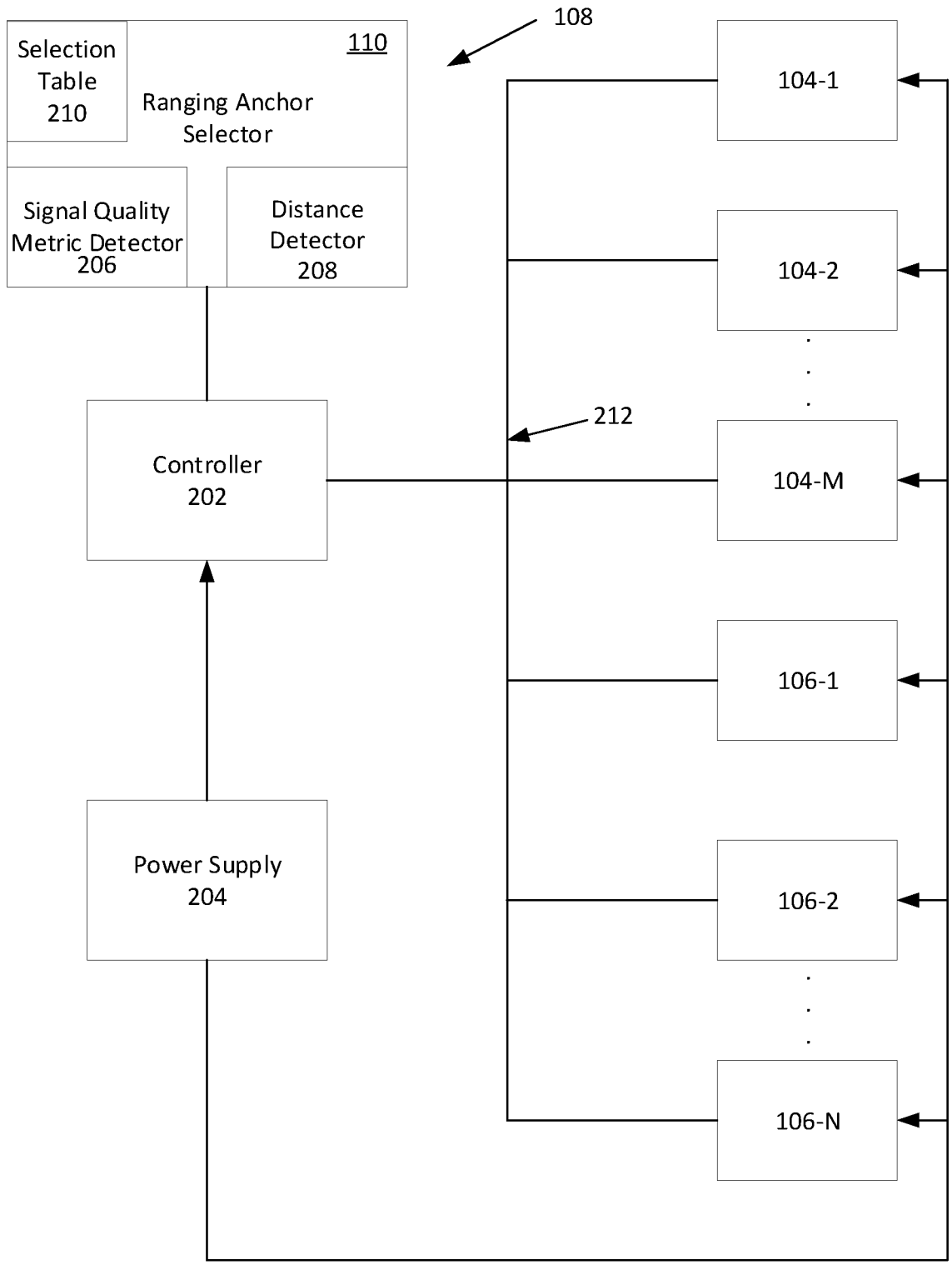
FIG. 2 illustrates an example block diagram of a host computing system associated with the example ranging system in accordance with embodiments of the invention.

FIG. 2 illustrates an example block diagram of the host computing system 108 associated with the example ranging system 100 in accordance with embodiments of the invention. The host computing system 108 is shown to include a ranging anchor selector 110, controller 202, power supply 204, connection anchors 104, and ranging anchors 106. In examples, ranging anchor selector 110, controller 202, power supply 204, connection anchors 104, and ranging anchors 106 of the host computing system 108 may be each implemented in software, circuitry such as analog circuitry, mix signal circuitry, memory circuitry, logic circuitry, processing circuitry, or combinations thereof.

The host computing system 108 may have a controller 202 coupled to one or more connection anchors 104 and one or more ranging anchors 106. The host computing system 108 may have M connection anchors 104 and N ranging anchors 106 where M is greater than zero and N is greater than one and M and N may or might not be equal to each other. In examples, the controller 202 may be coupled to the one or more connection anchors 104 and one or more ranging anchors 106 by a bus structure 212 such as a controller area network (CAN) bus associated with vehicle applications. Based on a characteristic of communications between a connection anchor and the mobile electronic device 102, the controller 202 may be arranged to select the one or more ranging anchors 106 to determine a distance to the mobile electronic device 102. Examples of the characteristic may include the signal quality metric or a distance between the connection anchor 104 and the mobile electronic device 102 (e.g., determined as described above as a coarse distance). The controller 202 may also facilitate a distance determination between the mobile electronic device and a ranging anchor 106 by providing an indication to the mobile electronic device 102 of the selected ranging anchors 106. The host computing system 108 may also have a power supply 204. The power supply 204 may provide power to the controller 202, the one or more connection anchors 104, and the one or more ranging anchors 106.

The ranging anchor selector 110 coupled to the controller 202 may select ranging anchor(s) to use for determining a distance between the mobile electronic device 102 and the ranging anchor(s) 106. The ranging anchor selector 110 may further comprise one or more of a signal quality metric detector 206, distance detector 208, or a combination thereof. The signal quality metric detector 206 may be arranged to determine a signal quality metric between a connection anchor and the mobile electronic device 102. The signal quality metric may be one or more of the main path power, RSSI, or error rate associated with communication between a connection anchor and the mobile electronic device 102. The distance detector 208 may be arranged to use the connection anchor to determine a distance between the connection anchor and the mobile electronic device 102 based on a time of flight of wireless signals communicated between the connection anchor and the mobile electronic device 102. In examples, the distance may be a coarse distance determination. The ranging anchor selector 110 may then select a ranging anchor to make a distance determination (e.g., finer distance determination) to the mobile electronic device 102 based on the signal quality metric, the determined distance based on ToF using the connection anchor, or combination thereof. In examples, those connection anchors 104 with signal quality metric and/or distance that meet a respective threshold may be used to select the ranging anchor(s). In examples, the selected ranging anchor(s) may be those in proximity to or on a same side of the vehicle 150 as the connection anchor(s) with signal quality metrics and/or distances that meet a respective threshold. The ranging anchor selector 110 may then provide an indication of the selected ranging anchor(s) to the controller 202 and the controller 202 may provide the indication of the selected ranging anchor(s) to the mobile electronic device 102 via a wireless signal 152. The mobile electronic device 102 may communicate with the selected ranging anchor(s) to determine the distance between the selected ranging anchor(s) and the mobile electronic device 102. The distance determined using the ranging anchors 106 may be based on UWB technology or BLE with HADM in examples. In examples, the UWB technology or BLE with HADM may determine the distance also based on a ToF but which is finer than a distance determined by the connection anchors 104.

In examples, the ranging anchor selector 106 may have a selection table 210 stored in a memory to select one or more ranging anchor(s). The ranging anchor(s) which are selected as a result of the selection table 210 are those which may provide a reliable determination of distance to the mobile electronic device 102.

FIG. 3 illustrates an example selection table 210 to select the one or more ranging anchor(s) to determine a distance to the mobile electronic device 102 in accordance with embodiments of the invention. The selection table 210 may have a number of rows, shown as example rows 1, 2 . . . Z in an index column 302 where Z>1. Each row may identify one or more connection anchor(s) with one or more characteristics of communications which meets a respective threshold. The characteristic that is met may include one or more of a signal quality metric designated as SQM, a distance designated as D, or a combination thereof. In the example selection table 210, column 304 may identify the one or more connection anchor(s) with the one or more characteristics of communications which meets a respective threshold. For instance, 104-3 (SQM) in row 1 may indicate that a signal quality metric associated with the connection anchor 104-3—meets a threshold. As another example, 104-1 (SQM, D) and 104-2 (SQM, D) in row 2 may indicate that the signal quality metric and a distance associated with the connection anchors 104-1, 104-2 meets a respective threshold. For those connection anchors 304 identified in a row, the column 306 in the row may identify the ranging anchor(s) that should be selected to perform a respective ranging operation with the mobile electronic device 102.

The identified ranging anchor(s) in the row may provide a reliable ranging operation with the mobile electronic device 102.

In operation, the ranging anchor selector 110 may access a row of the selection table 210. The ranging anchor selector 110 may have previously identified the one or more connection anchor(s) which have a SQM or D which meets a respective threshold. The ranging anchor selector 110 may compare the identified connection anchor(s) to the connection anchor(s) identified in the column 304. In the event that the identified connection anchor(s) match the connection anchors identified in one or more cells of the column 304, the column 306 of the corresponding row identifies the ranging anchor(s) that should be selected to perform the respective fine distance determination to the mobile electronic device 102. The ranging anchor selection circuit 110 may provide the identified ranging anchor(s) to the controller 202 as selected ranging anchor(s) and the controller 202 may provide an indication of the selected ranging anchor(s) to the mobile electronic device 102 to facilitate performing the respective distance determination to the mobile electronic device 102 via the selected ranging anchor(s).

For any given row, the connection anchor(s) identified in column 304 and the ranging anchor(s) identified in column 306 may have a physical relationship. For any given row, the ranging anchor(s) identified in column 306 may be in proximity to the connection anchor(s) identified in column 304 or on a same side of the vehicle 150 to improve reliability of ranging. To illustrate, referring back, FIG. 1 shows a physical location of the connection anchor(s) and the selected ranging anchor(s). As illustrated, connection anchor 104-3 in row 1 and the selected ranging anchors 106-1 and 106-3 may be on a same side of the vehicle or in proximity to each other to improve reliability of determining distance to the mobile electronic device 102. Additionally, the connection anchors 104-1 and 104-2 in row 2 and the selected ranging anchors 106-1 and 106-3 may be in proximity to each other or on a same side of the vehicle 150 to improve reliability of determining distance to the mobile electronic device 102.

Example Functions

Figure 4:
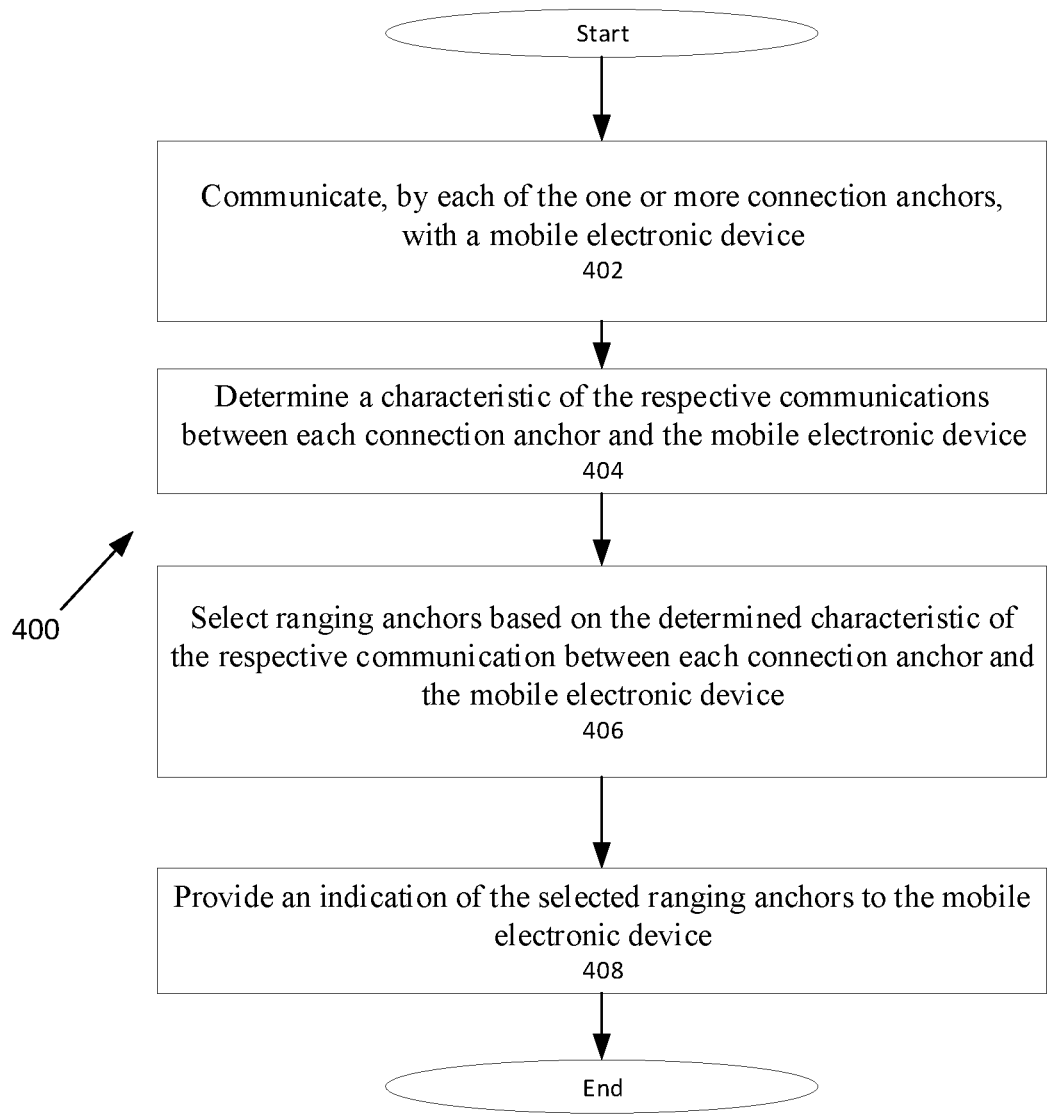
FIG. 4 is an example flow chart of functions performed by the host computing system for selecting the ranging anchors in accordance with embodiments of the invention.

FIG. 4 is an example flow chart of functions 400 performed by the host computing system 108 in the vehicle 150 to select the ranging anchor(s) to perform the ranging with the mobile electronic device 102 in accordance with embodiments of the invention. The functions 400 may be implemented in software, analog circuitry, mix signal circuitry, memory circuitry, logic circuitry, processing circuitry, or combinations thereof.

At step 402, each of one or more connection anchors 104 communicate with the mobile electronic device. Each connection anchor communicates with the mobile electronic device 102 and one or more connection anchors initiate various functions associated with an automobile application such as door unlock, enabling engine start, activating external/internal lighting, or other driver preferences. In examples, the controller 202 may cause one or more connection anchors 104 to send a respective first wireless signal to the mobile electronic device 102. In examples, the connection anchors 104 may operate in accordance with BLE and the respective first wireless signal may be a beacon or advertisement associated with BLE. Then, the one or more connection anchors 104 may receive, from a mobile electronic device 102, a respective response signal to the respective first wireless signal sent by the one or more connection anchors 104. In examples, the response may be a second wireless signal. In some examples, at least one connection anchor may be used to authenticate the mobile electronic device 102 based on the respective communication.

At step 404, a characteristic of the respective communications between each connection anchor 104 and the mobile electronic device 102 is determined. The characteristic may be a signal quality metric determined by the signal quality metric detector 206 or a distance determined by the distance detector 208 based on a time of flight of wireless signals communicated between a connection anchor and the mobile electronic device 102. The signal quality metric associated with a connection anchor may be a main path power, RSSI, or error rate, among other examples, associated with the respective response signal. The distance may be a determination of an approximate physical distance between a connection anchor and the mobile electronic device 102. In examples, the distance detector 208 may determine the distance based on ToA and ToD measurements taken by the connection anchor 104 and/or the mobile electronic device 102, respectively, as described earlier.

At step 406, ranging anchor(s) 106 are selected based on the determined characteristic of the respective communication between each connection anchor 104 and the mobile electronic device 102. In examples, the respective characteristics of communication between each connection anchor 104 and the mobile electronic device 102 may be compared to a respective threshold and the ranging anchor selector 110 may select the ranging anchor(s) based on the comparison meeting a respective threshold (e.g., using a selection table such as table 210, FIG. 3). An indication of the selected ranging anchor(s) may be output by the ranging anchor selection circuitry 110.

At step 408, an indication of the selected ranging anchor(s) is provided to the mobile electronic device 102. The selected ranging anchor(s) may then be used to perform UWB ranging or BLE HADM ranging to the mobile electronic device 102. In examples, a distance (e.g. physical distance or ToF distance) between a selected ranging anchors and the mobile electronic device 102 is determined. This distance determination is repeated for each of three selected ranging anchors to determine respective distances and a triangulation algorithm is used to determine an absolute position of the mobile electronic device 102 (i.e., indicating distance and direction). In other examples, the distance determination is repeated for each of two selected ranging anchors to determine respective distances and a perpendicular distance from the mobile electronic device 102 to the vehicle 150 is determined. Further, a position of the mobile electronic device 102 may change over time. In examples, the steps 402-408 may be repeated to account for movement of the mobile electronic device 102. The determined distance may be used to provide access to the vehicle 150 in examples. The access includes unlocking a door of the vehicle on approach to the vehicle (e.g., when the driver is within a pre-defined distance), and locking the door when the driver walks away from the vehicle (e.g., when the driver is outside a pre-defined distance), among other functions.

In one embodiment, a method is disclosed. The method comprises communicating, by a first anchor of a first type, with a mobile electronic device; determining a characteristic of the communications between the first anchor of the first type and the mobile electronic device; selecting one or more second anchors each of a second type, the one or more second anchors each of the second type selected based on the characteristic of the communications; and determining, by each of the selected one or more second anchors each of the second type, a respective distance to the mobile electronic device. In an embodiment, selecting one or more second anchors comprises: determining that the characteristic of the communications meets a threshold, accessing a selection table stored in memory which identifies one or more second anchors related to the first anchor that has the characteristic of the communications meeting the threshold, and selecting the one or more second anchors each of the second type based on the one or more second anchors related to the first anchor that has the characteristic of the communications meeting the threshold. In an embodiment, selecting one or more second anchors comprises: determining that the characteristic of the communications meets a threshold; the first anchor and the one or more second anchors are mounted on a vehicle; and wherein the selected one or more second anchors are on a same side of the vehicle as the first anchor that has the characteristic of the communications meeting the threshold. In an embodiment, the characteristic of communications is selected from one of a received signal strength indicator (RSSI) and a distance between the first anchor and the mobile electronic device determined based on time of flight of wireless signals exchanged between the first anchor and the mobile electronic device. In an embodiment, the first anchor of the first type operates with a first radio technology and the second anchors each of the second type operate with a second radio technology. In an embodiment, the first radio technology is Bluetooth Low Energy (BLE) and the second radio technology is ultra-wide band (UWB) technology or BLE with high accuracy distance measurement (HADM). In an embodiment, selecting one or more second anchors comprises: determining that the characteristic of the communications meets a threshold; and the selected one or more second anchors are within a threshold distance from the first anchor that has the characteristic of the communications meeting a threshold. In an embodiment, selecting one or more second anchors comprises: selecting the one or more second anchors before activating any of the one or more second anchors to determine the distance to the mobile electronic device.

In another embodiment, a system is disclosed. The system comprises a first anchor of a first type; one or more second anchors, each of a second type; and a second anchor selector; wherein the first anchor of the first type is arranged to communicate with a mobile electronic device, wherein the second anchor selector is arranged to determine a characteristic of communication between the first anchor of the first type and the mobile electronic device, and to select at least one of the one or more second anchors each of the second type based on the characteristic of the communications, and wherein each of the selected at least one second anchor is arranged to determine a respective distance to the mobile electronic device. In an embodiment, the second anchor selector is arranged to determine that the characteristic of the communications meets a threshold, access a selection table stored in memory which identifies one or more second anchors related to the first anchor that has the characteristic of the communications meeting the threshold, and select the one or more second anchors each of the second type based on the one or more second anchors related to the first anchor that has the characteristic of the communications meeting the threshold. In an embodiment, the second anchor selector is configured to determine that the characteristic of the communications meets a threshold; the first anchor and the one or more second anchors are mounted on a vehicle; and the selected at least one second anchor is on a same side of the vehicle as the first anchor that has the characteristic of the communications meeting the threshold. In an embodiment, the characteristic of communications is selected from one of a received signal strength indicator (RSSI) and a distance between the first anchor and the mobile electronic device determined based on time of flight of wireless signals exchanged between the first anchor and the mobile electronic device. In an embodiment, the second anchor selector is configured to determine that the characteristic of the communications meets a threshold; and the selected at least one second anchor is within a threshold distance from the first anchor that has the characteristic of the communications meeting the threshold. In an embodiment, the first anchor of the first type operates with a first radio technology and the one or more second anchors each of the second type operate with a second radio technology. In an embodiment, the first radio technology is Bluetooth Low Energy (BLE) and the second radio technology is ultra-wide band (UWB) technology or BLE with high accuracy distance measurement (HADM). In an embodiment, the second anchor selector is configured to select at least one of one or more second anchors before activating any of the one or more second anchors.

In yet another embodiment, a system is disclosed. The system comprises a first anchor of a first type; one or more second anchors each of a second type; and second anchor selector; wherein the first anchor of the first type is arranged to communicate with a mobile electronic device, and wherein the second anchor selector is arranged to: determine a received signal strength indicator (RSSI) of the communication between the first anchor of the first type and the mobile electronic device, compare the RSSI of the first anchor of the first type to a threshold, and select at least one of the one or more second anchors each of the second type based the RSSI exceeding the threshold, the at least one of the one or more second anchors each of the second type being selected without activating any of the one or more second anchors each of the second type, and wherein each of the selected at least one second anchor each of the second type is arranged to determine a respective distance to the mobile electronic device. In an embodiment, the first anchor of the first type operates with Bluetooth Low Energy (BLE) radios and the one or more second anchors each of the second type operate with ultra-wide band (UWB) technology or BLE with high accuracy distance measurement (HADM) radios. In an embodiment, the selected at least one second anchor is within a threshold distance from the first anchor that has the RSSI meeting a threshold. In an embodiment, the selected at least one second anchor is on a same side of a vehicle as the first anchor that has the RSSI meeting a threshold.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as a program code encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

The foregoing description refers to features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically.

Other implementations fall within the scope of the following claims.

What is claimed is:

1. A method comprising:
communicating, by at least two first anchors of a first type on a vehicle, with a mobile electronic device;
determining a respective characteristic of the communications and a respective distance between each of the at least two first anchors of the first type and the mobile electronic device;
selecting two or more second anchors each of a second type on the vehicle, the two or more second anchors each of the second type selected based on the respective characteristic of the communications between each of the at least two first anchors and the mobile electronic device and a proximity of each of the at least two first anchors to the selected two or more second anchors, the characteristic being an error rate and a main path power of communication between each of the at least two first anchors and the mobile electronic device, wherein the two or more selected second anchors are in the proximity based on each of the two or more selected second anchors being a threshold distance away from the at least two first anchors, the threshold distance being smaller than a distance between each of the at least two first anchors and a farthest anchor of the second type on the vehicle; and
determining, by each of the selected two or more second anchors each of the second type, a respective distance to the mobile electronic device.

2. The method of claim 1, wherein selecting two or more second anchors comprises: determining that the characteristic of the communications meets a threshold, accessing a selection table stored in memory which identifies two or more second anchors related to the at least two first anchors that has the characteristic of the communications meeting the threshold, and selecting the two or more second anchors each of the second type based on the two or more second anchors related to the at least two first anchors that has the characteristic of the communications meeting the threshold.

3. The method of claim 1, wherein selecting two or more second anchors comprises: determining that the characteristic of the communications meets a threshold; wherein the at least two first anchors and the two or more second anchors are mounted on a vehicle; and wherein the selected two or more second anchors are on a same side of the vehicle as the at least two first anchors that has the characteristic of the communications meeting the threshold.

4. The method of claim 1, wherein the characteristic of communications is selected from one of a received signal strength indicator (RSSI) and a respective distance between the at least two first anchors and the mobile electronic device determined based on time of flight of wireless signals exchanged between each of the at least two first anchors and the mobile electronic device.

5. The method of claim 1, wherein the at least two first anchors of the first type operates with a first radio technology and the two or more second anchors each of the second type operate with a second radio technology.

6. The method of claim 5, wherein the first radio technology is Bluetooth Low Energy (BLE) and the second radio technology is ultra-wide band (UWB) technology or BLE with high accuracy distance measurement (HADM).

7. The method of claim 1, wherein selecting two or more second anchors comprises: determining that the characteristic of the communications meets a threshold; wherein the selected two or more second anchors are within a threshold distance from each of the at least two first anchors that has the characteristic of the communications meeting the threshold.

8. The method of claim 1, wherein selecting two or more second anchors comprises: selecting the two or more second anchors before activating any of the two or more second anchors to determine the distance to the mobile electronic device.

9. A system comprising:
at least two first anchors of a first type on a vehicle;
at least two second anchors, each of a second type; and
a second anchor selector;
wherein the at least two first anchors of the first type are arranged to communicate with a mobile electronic device,
wherein the second anchor selector is arranged to determine a respective characteristic of communication between each of the at least two first anchors of the first type and the mobile electronic device, and to select two or more second anchors of the at least two second anchors each of the second type based on the respective characteristic of the communications and the respective distance between each of the at least two first anchors and the mobile electronic device and a proximity of each of the at least two first anchors to the selected two or more second anchors of the two or more second anchors, the characteristic being an error rate and a main path power of communication between each of the at least two first anchors and the mobile electronic device, wherein the two or more selected second anchors are in the proximity based on each of the two or more selected second anchors being a threshold distance away from the at least two first anchors, the threshold distance being smaller than a distance between each of the at least two first anchors and a farthest anchor of the second type on the vehicle, and wherein each of the selected two or more second anchors are arranged to determine a respective distance to the mobile electronic device.

10. The system of claim 9, wherein the second anchor selector is arranged to determine that the characteristic of the communications meets a threshold, access a selection table stored in memory which identifies two or more second anchors related to the first anchor that has the characteristic of the communications meeting the threshold, and select the two or more second anchors each of the second type based on the two or more second anchors related to the first anchor that has the characteristic of the communications meeting the threshold.

11. The system of claim 9, wherein the second anchor selector is configured to determine that the characteristic of the communications meets a threshold; wherein the at least two first anchors and the two or more second anchors are mounted on a vehicle; and wherein the selected two or more at least one second anchors are on a same side of the vehicle as the at least two first anchors that has the characteristic of the communications meeting the threshold.

12. The system of claim 9, wherein the characteristic of communications is selected from one of a received signal strength indicator (RSSI) and a distance between the first anchor and the mobile electronic device determined based on time of flight of wireless signals exchanged between the at least two first anchors and the mobile electronic device.

13. The system of claim 9, wherein the second anchor selector is configured to determine that the characteristic of the communications meets a threshold; and wherein the selected two or more second anchors is within a threshold distance from each of the at least two first anchors that has the characteristic of the communications meeting the threshold.

14. The system of claim 9, wherein the at least two first anchors of the first type operates with a first radio technology and the two or more second anchors each of the second type operate with a second radio technology.

15. The system of claim 9, wherein the first radio technology is Bluetooth Low Energy (BLE) and the second radio technology is ultra-wide band (UWB) technology or BLE with high accuracy distance measurement (HADM).

16. The system of claim 9, wherein the second anchor selector is configured to select the two or more second anchors before activating any of the two or more second anchors.

17. A system comprising:
at least two first anchors of a first type on a vehicle;
at least two or more second anchors each of a second type; and
second anchor selector;
wherein the at least two first anchors of the first type are arranged to communicate with a mobile electronic device, and
wherein the second anchor selector is arranged to: determine a respective received signal strength indicator (RSSI), error rate, and main power of the communication between each of the at least two first anchors of the first type and the mobile electronic device, compare the respective RSSI, error rate, and main power of the communication to a respective threshold, and select two or more second anchors of the at least two second anchors each of the second type based the respective RSSI, error rate, and main power between each of the at least two first anchors and the mobile electronic device and the respective distance between each of the at least two first anchors and the mobile electronic device exceeding respective thresholds and a proximity of each of the at least two first anchors to the selected two or more selected second anchors, wherein the two or more selected second anchors are in the proximity based on each of the two or more selected second anchors being a threshold distance away from the at least two first anchors, the threshold distance being smaller than a distance between each of the at least two first anchors and a farthest anchor of the second type on the vehicle, the selected at least one of the one or more second anchors each of the second type being selected without activating any of the one or more second anchors each of the second type, and
wherein each of the selected two or more second anchors each of the second type are arranged to determine a respective distance to the mobile electronic device.

18. The system of claim 17, wherein the at least two first anchors of the first type operates with Bluetooth Low Energy (BLE) radios and the two or more second anchors each of the second type operate with ultra-wide band (UWB) technology or BLE with high accuracy distance measurement (HADM) radios.

19. The system of claim 17, wherein the selected two or more second anchors is within a threshold distance from the at least two first anchors that has the RSSI meeting the threshold.

20. The system of claim 17, wherein the selected two or more second anchor is on a same side of a vehicle as the at least two first anchors that has the RSSI meeting the threshold.

21. The method of claim 1, wherein the selected two or more second anchors are closest to the at least two first anchors associated with determining the characteristic of communication.

22. The system of claim 9, wherein the selected two or more second anchors are closest to the at least two first anchors associated with determining the characteristic of communication.

23. The system of claim 17, wherein the selected two or more second anchors are closest to the at least two first anchors associated with determining the characteristic of communication.

* * * * *